United States Patent
Marsal et al.

(10) Patent No.: US 7,361,237 B2
(45) Date of Patent: Apr. 22, 2008

(54) HIGH-STRENGTH ISOTROPIC STEEL, METHOD FOR MAKING STEEL PLATES AND RESULTING PLATES

(75) Inventors: Joël Marsal, Beyren les Sierck (FR); Dominique Mescolini, Metz (FR)

(73) Assignee: USINOR, Puteaux (FR)

( * ) Notice: Subject to any disclaimer, the term of this patent is extended or adjusted under 35 U.S.C. 154(b) by 173 days.

(21) Appl. No.: 10/470,247

(22) PCT Filed: Jan. 21, 2002

(86) PCT No.: PCT/FR02/00225

§ 371 (c)(1),
(2), (4) Date: Jan. 14, 2004

(87) PCT Pub. No.: WO02/059384

PCT Pub. Date: Aug. 1, 2002

(65) Prior Publication Data

US 2004/0112483 A1     Jun. 17, 2004

(30) Foreign Application Priority Data

Jan. 26, 2001   (FR) ................... 01 01126

(51) Int. Cl.
*C22C 38/02* (2006.01)
*C22C 38/04* (2006.01)
*C21D 8/00* (2006.01)

(52) U.S. Cl. ............ 148/330; 148/603; 148/651; 148/320; 148/537; 420/121

(58) Field of Classification Search ............... 148/330, 148/320, 603, 537, 651; 420/121, 128, 8
See application file for complete search history.

(56) References Cited

U.S. PATENT DOCUMENTS

| | | | | |
|---|---|---|---|---|
| 4,853,032 | A | * 8/1989 | Yalamanchili et al. | ...... 75/10.49 |
| 5,919,415 | A | * 7/1999 | Pichard | ...................... 420/106 |
| 6,162,308 | A | 12/2000 | Heckelmann et al. | |
| 6,171,413 | B1 * | 1/2001 | Funakawa et al. | .......... 148/330 |

FOREIGN PATENT DOCUMENTS

| DE | 197 01 443 A1 | | 7/1998 | |
|---|---|---|---|---|
| EP | 0 475 096 A1 | | 3/1992 | |
| EP | 0 510 718 A2 | | 10/1998 | |
| EP | 0 870 848 A1 | | 10/1998 | |
| EP | 0 905 267 A1 | | 3/1999 | |
| JP | 355145123 | * | 11/1980 | ................ 148/603 |
| JP | 358048637 | * | 3/1983 | ................ 148/599 |
| JP | 360238449 | * | 11/1985 | ................ 420/121 |
| JP | 362284016 | * | 12/1987 | ................ 148/111 |

* cited by examiner

*Primary Examiner*—Deborah Yee
(74) *Attorney, Agent, or Firm*—Sughrue Mion, PLLC

(57) ABSTRACT

A steel having a composition, expressed in wt. %, of: $0.03 \leq C \leq 0.06$; $0.50 \leq Mn \leq 1.10$; $0.08 \leq Si \leq 0.20$; $0.015 \leq Al \leq 0.070$; $N \leq 0.007$; $Ni \leq 0.040$; $Cu \leq 0.040$; $P \leq 0.035$; $S \leq 0.015$; $Mo \leq 0.008$; $Ti \leq 0.005$; and boron in an amount such that: $0.65 \leq B/N \leq 1.60$, the rest of the composition consisting of iron and impurities resulting from preparation. Also a method for making steel plates having this composition, and the resulting plates, produced by the method.

12 Claims, No Drawings

HIGH-STRENGTH ISOTROPIC STEEL, METHOD FOR MAKING STEEL PLATES AND RESULTING PLATES

The present invention relates to high-strength isotropic steel and to sheet made of said steel, having improved mechanical properties and capable of undergoing a heat treatment without aging.

This type of steel is used especially for the manufacture of visible parts for automobiles that have an organic coating.

These parts are generally formed by drawing, which assumes that the steel has a high level of ductility and is as isotropic as possible in order to obtain good stretching of the parts. Furthermore, it is also desirable to have good dent resistance, which can be obtained by a high yield strength.

Before this forming step, the parts are covered with organic coatings that are baked during a specified heat treatment, the maximum temperature of which is currently around 250° C. for a time of about 30 seconds.

However, this type of heat treatment may lead to an aging phenomenon in the steel, which is reflected by an increase in the yield strength, by a reduction in the ductility and above all by the appearance of a yield plateau. The existence of this plateau is unacceptable as it is the origin of highly visible stretcher strains during drawing, giving rise to unacceptable surface defects.

Thus, EP 0 870 848 teaches an extra-mild aluminum-killed niobium steel which has good mechanical strength properties and good ductility properties, but which is subject to the aging phenomenon that has just been mentioned and is therefore unacceptable for depositing a coating that requires a heat treatment before drawing.

The object of the present invention is therefore to make available an isotropic metallic material that has both good ductility and a high yield strength without a plateau, and that can undergo a heat treatment after the deposition of an organic coating without aging.

For this purpose, a first subject of the invention consists of a steel whose composition comprises, expressed in % by weight:

$$0.03 \leq C \leq 0.06$$
$$0.50 \leq Mn \leq 1.10$$
$$0.08 \leq Si \leq 0.20$$
$$0.015 \leq Al \leq 0.070$$
$$N \leq 0.007$$
$$Ni \leq 0.040$$
$$Cu \leq 0.040$$
$$P \leq 0.035$$
$$S \leq 0.015$$
$$Mo \leq 0.008$$
$$Ti \leq 0.005$$

it being understood that it also includes boron in an amount such that:

$$0.65 \leq \frac{B}{N} \leq 1.60$$

the balance of the composition being formed from iron and impurities resulting from the smelting.

The present inventors have in fact discovered that the particular balance of the contents of alloying elements makes it possible, surprisingly, to obtain a grade of steel having all the desired properties.

The carbon content of the composition according to the invention is between 0.03 and 0.06% by weight, since this element substantially lowers the ductility. However, it is necessary to have a minimum of 0.03% by weight of carbon in order to avoid any aging problem.

The manganese content of the composition according to the invention must be between 0.50 and 1.10% by weight. Manganese improves the yield strength of the steel while greatly reducing its ductility. It also reduces the aging tendency. Below 0.50% by weight, aging problems are observed, whereas a content above 1.10% by weight excessively impairs the ductility.

The silicon content of the composition according to the invention must be between 0.08 and 0.20% by weight. It greatly improves the yield strength of the steel while slightly reducing its ductility, but it substantially increases its aging tendency. If its content is less than 0.08% by weight, the steel does not have good mechanical properties, whereas if it exceeds 0.20% by weight, surface appearance problems, in the form of tiger stripes, arise.

In a preferred embodiment of the invention, the ratio of the manganese content to the silicon content is between 4 and 15 so as to avoid any problem of brittleness in flash welding. This is because, if said ratio is outside these values, the formation of embrittling oxides are observed during this welding operation.

In another preferred embodiment of the invention, the manganese content is between 0.55 and 0.65% by weight and the silicon content is between 0.08 and 0.12% by weight. This embodiment makes it possible to obtain grades having improved ductility and a yield strength of greater than 220 MPa.

In another preferred embodiment of the invention the manganese content is between 0.95 and 1.05% by weight and the silicon content is between 0.16 and 0.20% by weight. This embodiment makes it possible to obtain grades of high ductility having an improved tensile strength and a yield strength of greater than 260 MPa.

The nitrogen content of the composition must be less than 0.007% by weight, preferably less than 0.005% by weight, as this element degrades the mechanical properties of the steel. Its presence in the steel according to the invention results from the smelting.

The boron content of the composition according to the invention must be such that:

$$0.65 \leq \frac{B}{N} \leq 1.60.$$

The main function of the boron is to fix the nitrogen by early precipitation of boron nitrides. It must therefore be present in an amount sufficient to avoid too large an amount of nitrogen to remain free, without however exceeding the stoichiometric amount by too much, as the residual amount that is free could pose metallurgical problems and coloration of the coil edges. As an indication, it should be mentioned that strict stoichiometry is achieved with a B/N ratio of 0.77.

The aluminum content of the composition according to the invention is between 0.015 and 0.070% by weight, without this being of critical importance. The aluminum is present in the grade according to the invention because of the casting process during which this element is added in order to deoxidize the steel. However, it is important not to exceed 0.070% by weight as problems of aluminum oxide inclusions would then be encountered, these being detrimental to the mechanical properties of the steel.

Phosphorus is limited in the steel according to the invention to a content of less than 0.035% by weight, preferably less than 0.015% by weight. It allows the yield strength of the grade to be increased, but at the same time it increases its aging tendency in heat treatments, which explains its limitation. It also has a detrimental effect on the ductility.

The titanium content of the composition must be less than 0.005% by weight, that of sulfur must be less than 0.015% by weight, that of nickel must be less than 0.040% by weight, that of copper must be less than 0.040% by weight and that of molybdenum must be less than 0.008% by weight. These various elements constitute in fact the residual elements arising from the smelting of the grade that are usually encountered. Their contents are limited as they are liable to form inclusions that reduce the mechanical properties of the grade.

A second subject of the invention consists of a process for manufacturing a sheet of composition according to the invention, comprising:

smelting of the steel and casting of a slab;
hot rolling of this slab to obtain a sheet, the end-of-rolling temperature being above that of the Ar3 point;
coiling of the sheet at a temperature between 500 and 700° C.;
cold rolling of the sheet with a reduction ratio of 50 to 80%;
recrystallization heat treatment; and
skin-pass rolling with a skin-pass reduction of preferably between 1.2 and 2.5%.

The composition according to the invention may be smelted in a conventional manner and by any suitable process.

After smelting, the steel may be cast in the form of a semifinished product, such as a slab, which is reheated to a temperature of around 1230° C. to about 1260° C. in order to hot roll it, the end-of-rolling temperature being above Ar3, which here is around 810° C. A sheet is thus obtained. The end-of-rolling temperature is preferably below that of the Ar3 point +20° C. After this operation, the sheet thus produced is coiled at a temperature of between 500 and 700° C.

In a preferred method of implementation, the sheet is coiled at a temperature of between 580° C. and 620° C. so as to limit grain size, thereby allowing the yield strength to be increased.

The sheet is then cold rolled with a reduction ratio of 50 to 80%, preferably 60 to 78%, and undergoes a recrystallization heat treatment, preferably comprising a first step of static annealing in hydrogen at a temperature above the recrystallization temperature of the steel for 5 to 15 hours. As an indication, this recrystallization temperature of the grade is generally between 540 and 570° C. This annealing is carried out in hydrogen so as to avoid any coloration problem with the edges of the sheet.

The recrystallization heat treatment furthermore includes, preferably, a second step of slow static cooling carried out over a period of more than 30 hours, particularly preferably for a period of not less than 40 hours. This cooling is carried out slowly so as to ensure that the cementite precipitates in the ferritic matrix are perfectly stable. It is for this same reason that the cooling is carried out statically, thereby allowing this type of slow cooling to be obtained.

However, it remains perfectly possible to carry out more rapid cooling and to obtain the results desired in the present invention.

The sheet may then be subjected to skin-pass rolling with a skin-pass of preferably between 1.2 and 2.5%, and for example around 1.5%, which makes it possible to minimize any residual yield plateau. It is preferable not to exceed the 2.5% reduction as the ductility would be degraded, but it is also preferable not to go below 1.2% in order to avoid any aging problem.

Next, an organic coating may be deposited and the heat treatment needed to fix it may be carried out. Such a treatment may, for example, consist of rapid heating to 250° C. with a hold at this temperature for about 30 seconds, followed by cooling.

To be able to compare two heat treatments carried out at different temperatures for different times, a quantity called PAREQ is used, this being defined by:

$$PAREQ = -0.76 \times \log(\int \exp(-\Delta H/RT) \cdot dt)$$

with $\Delta H$: energy of diffusion of carbon in iron (about 112 kJ/mol);
T: temperature of the cycle;

the integration being over the heat treatment time.

The hotter or longer the heat treatment, the lower the PAREQ value. Two different heat treatments having an identical PAREQ value will give the same result on the same grade of steel.

If we consider a heat treatment that takes the steel at 250° C. with a hold of 30 seconds at this temperature, the PAREQ value is 10.26. Within the context of the present invention, heat treatments having a PAREQ value of between 9.80 and 11.5 are more particularly of interest.

The organic coatings involved in the present invention preferably refer to coatings comprising a crosslinkable resin and optionally balls of metal, such as zinc for example. These coatings are generally deposited as a thin film of the order of a few microns and serve in particular to protect the steel from corrosion.

If the steel according to the invention is more particularly intended to receive this type of coating, it will be understood that it can be used in any application that has to withstand heat treatments with a PAREQ of between 9.80 and 11.50, whether or not carried out after the application of a coating of any type.

A third subject of the invention consists of a sheet of isotropic steel having the composition according to the present invention and of a sheet obtained by implementing the process according to the invention in its various methods of implementation.

Isotropic steel sheet whose steel has a manganese content of between 0.55 and 0.65% by weight and a silicon content of between 0.08 and 0.12% by weight and has, after having undergone a heat treatment with a PAREQ value of between 9.8 and 11.5, a yield strength of greater than 220 MPa, an elongation of greater than 36% and a work-hardening coefficient of greater than 0.20 is preferred.

An isotropic steel sheet whose steel has a manganese content of between 0.95 and 1.05% by weight and a silicon content of between 0.16 and 0.20% by weight and has, after having undergone a heat treatment with a PAREQ value of between 9.8 and 11.5, a yield strength of greater than 260 MPa, a tensile strength of greater than 400 MPa and a work-hardening coefficient of greater than 0.18 is also preferred.

The present invention will be illustrated by the following examples, the table below giving the composition in % by weight of the various steels tested, among which heats 1 to 3 are in accordance with the present invention while heat 4 is used by way of comparison.

|    | Heat 1 | Heat 2 | Heat 3 | Heat 4 |
|----|--------|--------|--------|--------|
| C  | 0.041  | 0.045  | 0.038  | 0.025  |
| Mn | 0.853  | 0.989  | 0.598  | 0.227  |
| Si | 0.089  | 0.167  | 0.088  | 0.006  |
| N  | 0.0035 | 0.0042 | 0.0032 | 0.0041 |
| B  | 0.0026 | 0.0029 | 0.0051 | —      |
| Al | 0.035  | 0.031  | 0.038  | 0.050  |
| P  | 0.007  | 0.0065 | 0.007  | 0.006  |
| S  | 0.011  | 0.0056 | 0.01   | 0.012  |
| Cu | 0.018  | 0.025  | 0.012  | 0.010  |
| Ni | 0.020  | 0.022  | 0.019  | 0.017  |

-continued

|    | Heat 1 | Heat 2 | Heat 3 | Heat 4 |
|----|--------|--------|--------|--------|
| Cr | —      | 0.028  | —      | 0.032  |
| Ti | 0.0012 | 0.001  | —      | 0.002  |
| Nb | —      | —      | —      | 0.016  |
| Mo | 0.0012 | —      | 0.008  | —      |

The balance of the composition of heats 1 to 4 is of course formed by iron and possible impurities resulting from the smelting.

Abbreviations Employed:
A: elongate at break in %;
$R_E$: yield strength in MPa;
$R_m$: tensile strength in MPa;
n: work-hardening coefficient;
$\Delta r$: plane anisotropic coefficient;
r: anisotropic coefficient.

EXAMPLE 1

Yield Strength and Tensile Strength

A steel sheet having the composition of each of heats 1 to 3 according to the invention and from comparative heat 4 were manufactured by casting a slab and reheating it to about 1230° C., followed by hot rolling with an end-of-rolling temperature of 860° C. on average. The sheet was coiled at a temperature of about 585° C. and then cold rolled with a reduction ratio of 73%. It was then annealed in hydrogen at about 630° C. for 7 hours, followed by slow cooling over 30 hours. The process was completed by skin-pass rolling with a skin-pass reduction of 1.5%.

A first tensile test was then carried out in the direction transverse to the rolling direction according to the NF EN 10002-1 standard on specimens removed from the start and the end of the coil.

The sheet was then subjected to a heat treatment having a PAREQ of 10.26 and a second tensile test was carried out according to the NF EN 10002-1 standard. This heat treatment consisted of heating to 250° C. at a heating rate of 35° C. per second followed by a hold for 30 seconds at this temperature.

The yield strength and tensile strength values of the sheet were thus determined and the following results obtained:

|  | Heat 1 | | Heat 2 | | Heat 3 | | Heat 4 | |
|---|---|---|---|---|---|---|---|---|
|  | $R_e$ (MPa) | $R_m$ (MPa) | $R_e$ (MPa) | $R_m$ (MPa) | $R_e$ (MPa) | $R_m$ (MPa) | $R_e$ (MPa) | $R_m$ (MPa) |
| Before heat treatment | 241 | 373 | 258 | 400 | 243 | 357 | 262 | 353 |
| After heat treatment | 247 | 380 | 266 | 396 | 240 | 355 | 329 | 355 |

It may be seen that the $R_e$ and $R_m$ levels of heats 1 to 3 according to the invention are not degraded by the heat treatment, which confirms the suitability of the steel according to the present invention to undergo such a treatment.

It may also be seen that excellent values are obtained for heat 2 according to the invention, which achieves a yield strength of greater than 260 MPa and a tensile strength of 400 MPa.

EXAMPLE 2

Ductility

By carrying out the same tensile tests as those in example 1, the elongation at break A and the work-hardening coefficient n for the four heats were conventionally determined.

The tensile curves show firstly that no yield plateau is observed for heats 1 to 3 according to the invention, whether before or after the heat treatment. In contrast, comparative heat 4, which already showed a slight plateau before the heat treatment, has a plateau of more than 10% after this same treatment, thereby making it totally unsuitable for achieving the objectives of the present invention.

The other results are given in the table below:

|  | Heat 1 | | Heat 2 | | Heat 3 | | Heat 4 | |
| --- | --- | --- | --- | --- | --- | --- | --- | --- |
|  | A (%) | n | A (%) | n | A (%) | n | A (%) | n |
| Before heat treatment | 34.7 | 0.198 | 32.3 | 0.195 | 35.6 | 0.207 | 35.5 | 0.192 |
| After heat treatment | 34.9 | 0.190 | 34.3 | 0.180 | 36.5 | 0.202 | 34.7 | 0.216 |

On examining these results, good values of elongation at break values are especially obtained, thereby making it possible to ensure that the parts are properly manufactured by drawing. A good work-hardening coefficient n is also obtained, which ensures that a correct level of yield strength is obtained for the finished parts, by the work hardening effect during drawing.

It may also be seen that heat 3 according to the invention exhibits excellent ductility values, both as regards elongation at the break and work-hardening coefficient.

The values obtained for comparative heat 4 are given by way of indication, since these values are not significant when a plateau of more than 10% is present.

EXAMPLE 3

Isotropy

The overall anisotropy of a steel is determined by the mean normal anisotropy coefficient r:

$$r = \frac{r(0) + r(90) + 2r(45)}{4}$$

where r(0), r(90) and r(45) are the values of the normal anisotropy coefficients r in the longitudinal direction, transverse direction and 45° oblique direction with respect to the rolling direction.

The planar anisotropy coefficient Δr may be defined by:

$$\Delta r = \frac{r(0) + r(90) - 2r(45)}{2}$$

These coefficients were determined on the sheets before and after they were subjected to a heat treatment similar to that described in example 1. The results are given in the table below:

|  | Heat 1 | | Heat 2 | | Heat 3 | | Heat 4 | |
| --- | --- | --- | --- | --- | --- | --- | --- | --- |
|  | r | Δr | r | Δr | r | Δr | r | Δr |
| Before heat treatment | 1.27 | 0.17 | 1.25 | 0.11 | 1.30 | 0.25 | 1.33 | 0.19 |
| After heat treatment | 1.25 | 0.20 | 1.23 | 0.11 | 1.26 | 0.24 | 1.47 | 0.21 |

The values obtained for comparative heat 4 are given by way of indication, as these values are not significant when a plateau of more than 10% is present.

It may be seen that the isotropy of the heats of steel according to the invention is on average good and makes them suitable to undergo deep drawing, heat 2 having a particularly remarkable Δr value.

The present inventors have in fact shown that the boron nitrides formed in an uncontrolled manner in the steel precipitate in the sheet when hot and do not disturb the subsequent recrystallization. The sheet according to the invention thus has a micrographic grain structure with an elongation of close to 1 and low values of the anisotropy coefficient r.

The invention claimed is:

1. A steel whose composition comprises, expressed in % by weight:

$0.03 \leq C \leq 0.06$ $0.853\% \leq Mn \leq 1.10$ $0.08 \leq Si \leq 0.20$ $0.015 \leq Al \leq 0.070$ $N \leq 0.007$ $Ni \leq 0.040$ $Cu \leq 0.040$ $P \leq 0.035$ $S \leq 0.015$ $Mo \leq 0.008$ $Ti \leq 0.005$ it being understood that it also includes boron in an amount such that:

$$0.65 \leq \frac{B}{N} \leq 1.60;$$

and the manganese content and the silicon content are such that:

$$4 \leq \frac{\% Mn}{\% Si} \leq 15; \text{ and}$$

the balance of the composition being formed from iron and impurities resulting from the smelting, and wherein the manganese content is at least 0.853% by weight.

2. The steel as claimed in claim 1, wherein the manganese content is between 0.95 and 1.05% by weight and the silicon content is between 0.16 and 0.20% by weight.

3. The steel as claimed in claim 1, wherein the nitrogen content is less than 0.005% by weight.

4. The steel as claimed in claim 1, wherein the phosphorus content is less than 0.015% by weight.

5. A process for manufacturing a sheet of composition as claimed in claim 1, comprising:

smelting of the steel and casting of a slab;

hot rolling of this slab to obtain a sheet, the end-of-rolling temperature being above that of the Ar3 point;

coiling of the sheet at a temperature between 500 and 700° C.;

cold rolling of the sheet with a reduction ratio of 50 to 80%;

recrystallization heat treatment; and skin-pass rolling with a skin-pass reduction.

6. The process as claimed in claim 5, wherein said recrystallization heat treatment is a static annealing operation in hydrogen carried out at a temperature above the recrystallization temperature of the steel for 5 to 15 hours, followed by slow static cooling carried out over a period of more than 30 hours.

7. The process as claimed in claim 5, wherein an organic coating is deposited on the skin-passed sheet, and then the coated sheet undergoes a heat treatment whose PAREQ is between 9.80 and 11.5.

8. The process as claimed in claim 7, wherein said organic coating is based on a crosslinkable resin and includes metal balls.

9. A sheet of isotropic steel having a composition as claimed in claim 1.

10. The sheet of isotropic steel as claimed in claim 9, wherein the steel has a manganese content of between 0.95 and 1.05% by weight and a silicon content of between 0.16 and 0.20% by weight, the sheet having been coated with an organic coating and heat treated with a PAREQ value of between 9.8 and 11.5, and the sheet has a yield strength of greater than 260 MPa, a tensile strength of greater than 400 MPa and a work-hardening coefficient of greater than 0.18.

11. A process for manufacturing a sheet as claimed in claim 5, wherein the sheet is cold rolled with a reduction ratio of 60 to 78%.

12. A process for manufacturing a sheet as claimed in claim 5, wherein the skin-pass reduction of between 1.2 and 2.5%.

* * * * *